(12) United States Patent
Lee et al.

(10) Patent No.: US 12,494,202 B2
(45) Date of Patent: Dec. 9, 2025

(54) BRAIN SIGNAL-BASED USER ASSISTING METHOD AND APPARATUS

(71) Applicant: KOREA UNIVERSITY RESEARCH AND BUSINESS FOUNDATION, Seoul (KR)

(72) Inventors: Seong-Whan Lee, Seoul (KR); Seo-Hyun Lee, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 287 days.

(21) Appl. No.: 18/366,190

(22) Filed: Aug. 7, 2023

(65) Prior Publication Data

US 2024/0194198 A1 Jun. 13, 2024

(30) Foreign Application Priority Data

Dec. 7, 2022 (KR) .................. 10-2022-0169699

(51) Int. Cl.
*G10L 15/22* (2006.01)
*A61B 5/372* (2021.01)
*G10L 15/06* (2013.01)

(52) U.S. Cl.
CPC .............. *G10L 15/22* (2013.01); *A61B 5/372* (2021.01); *G10L 15/063* (2013.01); *G10L 2015/223* (2013.01)

(58) Field of Classification Search
CPC ........ G10L 15/22; G10L 15/063; A61B 5/372
See application file for complete search history.

(56) References Cited

U.S. PATENT DOCUMENTS

| 2020/0142481 | A1* | 5/2020 | Lee ..................... G06F 3/015 |
| 2020/0205740 | A1 | 7/2020 | Laszlo et al. |
| 2020/0337653 | A1* | 10/2020 | Alcaide ............... A61B 5/7475 |
| 2021/0255706 | A1 | 8/2021 | Lee et al. |

FOREIGN PATENT DOCUMENTS

| KR | 10-2015-0076932 A | 7/2015 |
| KR | 10-2019-0071104 A | 6/2019 |
| KR | 10-2020-0004771 A | 1/2020 |
| KR | 10-2020-0052807 A | 5/2020 |
| KR | 10-2094936 B1 | 5/2020 |
| KR | 10-2021-0062549 A | 5/2021 |

OTHER PUBLICATIONS

Korean Office Action issued on Jan. 24, 2025 in corresponding Korean Patent Application No. 10-2022-0169699 (9 pages in Korean).

* cited by examiner

*Primary Examiner* — Ibrahim Siddo
(74) *Attorney, Agent, or Firm* — NSIP Law (57) ABSTRACT

The present invention relates to a brain signal-based user assisting method including the steps of: acquiring learning data for setting a designated command; setting one of a plurality of designated command candidates as a designated command, based on the acquired learning data; performing a background process for recognizing the designated command; determining whether the designated command is recognized continuously more than given times, based on the background process; and if it is determined that the designated command is recognized continuously more than the given times, performing a user's brain signal recording.

11 Claims, 6 Drawing Sheets

BRAIN SIGNAL-BASED USER ASSISTING METHOD AND APPARATUS

CROSS REFERENCE TO RELATED APPLICATION OF THE INVENTION

The present application claims the benefit of Korean Patent Application No. 10-2022-0169699 filed in the Korean Intellectual Property Office on Dec. 7, 2022, the entire contents of which are incorporated herein by reference.

BACKGROUND OF THE INVENTION

Field of the Invention

The present invention relates to a brain signal-based user assisting method and apparatus, more particularly to a brain signal-based user assisting method and apparatus that is capable of analyzing brain signals, recognizing a user's intention, and providing an appropriate service corresponding to the recognized user intention.

Background of the Related Art

A brain-computer interface is a technology that detects significant signals from a user's brain signals, recognizes his or her intention, and provides an appropriate feedback for the recognized user intention. In conventional practices, the brain-computer interface is developed for tetraplegia patients who are hard to move their body, but recently, convenient assisting systems, which can be widely utilized for common people as well as patients, have been developed. A method for collecting brain signals is largely classified into an invasive method requiring surgery and a non-invasive method requiring no surgery, and it is necessary for common people to have the brain-computer interface utilizing the brain signals collected in the non-invasive method. However, the brain signals measured in the non-invasive method are lower in quality than those measured in the invasive method, and accordingly, accurate user intention recognition based on the brain signals measured in the non-invasive method is very challenging.

Recently, the non-invasive brain-computer interface has been developed to a trend toward imagined speech as the imagination of speech from motor imagery widely used in the existing practice. Unlike the brain signals related to motion imagination that are generated from the motor cortex of the brain, the brain signals related to the imagined speech are generated strongly from the left temporal robe, and accordingly, it is advantageously possible that the brain signals are measured through a brain signal measuring device simple in shape like an earphone around an ear where no hair. However, imagined speech can expand classes to be inputted infinitely, and to utilize an imagined speech-based communication system, accordingly, there is a need to develop a technology that can successfully recognize various user intentions and accurately detect the imagination time point of the user even in a situation with no external stimulations. The present invention relates to such a technology.

PRIOR ART LITERATURE

[Patent Literature] Korean Patent Application Laid-open No. 10-2019-0067069 (Dated on Jun. 14, 2019)

SUMMARY OF THE INVENTION

Accordingly, the present invention has been made in view of the above-mentioned problems occurring in the related art, and it is an object of the present invention to provide a brain signal-based user assisting method and apparatus that is capable of acquiring a user's brain waves in a non-invasive method when the user performs imagined speech for a specific command and thus accurately recognizing user intention only through the user's imagination.

It is another object of the present invention to provide a brain signal-based user assisting method and apparatus that is capable of designating specific commands by user that are most effectively recognized from complex and unclear non-invasive brain waves of a human and thus accurately detecting a time point when user intention is generated.

The technical problems to be achieved through the present invention are not limited as mentioned above, and other technical problems not mentioned herein will be obviously understood by one of ordinary skill in the art through the following description.

TO accomplish the above-mentioned objects, according to one aspect of the present invention, there is provided a brain signal-based user assisting method including the steps of: acquiring learning data for setting a designated command; setting one of a plurality of designated command candidates as a designated command, based on the acquired learning data; performing a background process for recognizing the designated command; determining whether the designated command is recognized continuously more than given times, based on the background process; and if it is determined that the designated command is recognized continuously more than the given times, performing a user's brain signal recording.

According to the present invention, desirably, the learning data may have at least some of the brain signals generated when the user performs imagined speech for the plurality of designated command candidates randomly.

According to the present invention, desirably, the step of setting the designated command may include the steps of: classifying the learning data collected for M designated command candidates into M+1 classes; determining true positive rates (TPRs) of the classes corresponding to the M designated command candidates; and determining as the designated command the designated command candidate corresponding to the class having the highest TPR.

According to the present invention, desirably, the step of setting the designated command may further include the step of acquiring the learning data for setting the designated command again if the TPRs of the classes corresponding to the M designated command candidates are less than or equal to a given reference value.

According to the present invention, desirably, the step of acquiring the learning data for setting the designated command again may include the step of recommending at least one designated command candidate to the user, and the learning data acquired again may be based on the at least one designated command candidate recommended.

According to the present invention, desirably, the step of performing the background process may include the steps of: acquiring the brain signals corresponding to a first time span; determining whether the brain signals corresponding to the first time span are the brain signals generated in a resting state or in a state of the imagined speech for the set designated command; and if it is determined that the brain signals corresponding to the first time span are the brain signals generated in the state of the imagined speech for the set designated command, determining that the designated command is recognized in the first time span.

According to the present invention, desirably, the step of performing the background process may further include the steps of: acquiring the brain signals corresponding to a second time span obtained by shifting the first time span by given time; determining whether the brain signals corresponding to the second time span are the brain signals generated in a resting state or in a state of the imagined speech for the set designated command; and if it is determined that the brain signals corresponding to the second time span are the brain signals generated in the state of the imagined speech for the set designated command, determining that the designated command is recognized in the second time span.

According to the present invention, desirably, the step of performing the user's brain signal recording may include the step of converting the user's recorded brain signals into a text.

According to the present invention, desirably, the brain signal-based user assisting method may further include the step of transmitting the converted text to a device for user feedback.

According to the present invention, desirably, the brain signal-based user assisting method may further include the step of completing the user's brain signal recording if the designated command is recognized continuously more than the given times after the step of performing the user's brain signal recording.

To accomplish the above-mentioned objects, according to another aspect of the present invention, there is provided a brain signal-based user assisting apparatus including: at least one processor; a memory for loading a computer program executed by the at least one processor; and a storage for storing the computer program, wherein through the at least one processor, the computer program may acquire learning data for setting one of a plurality of designated command candidates as a designated command, based on the acquired learning data, perform a background process for recognizing the designated command, determine whether the designated command is recognized continuously more than given times, based on the background process, and if it is determined that the designated command is recognized continuously more than the given times, perform a user's brain signal recording.

To accomplish the above-mentioned objects, according to yet another aspect of the present invention, there is provided a computer program stored in a computer readable recording the computer program being coupled to a computing device to acquire learning data for setting one of a plurality of designated command candidates as a designated command, based on the acquired learning data, perform a background process for recognizing the designated command, determine whether the designated command is recognized continuously more than given times, based on the background process, and if it is determined that the designated command is recognized continuously more than the given times, perform a user's brain signal recording.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Figure 1:
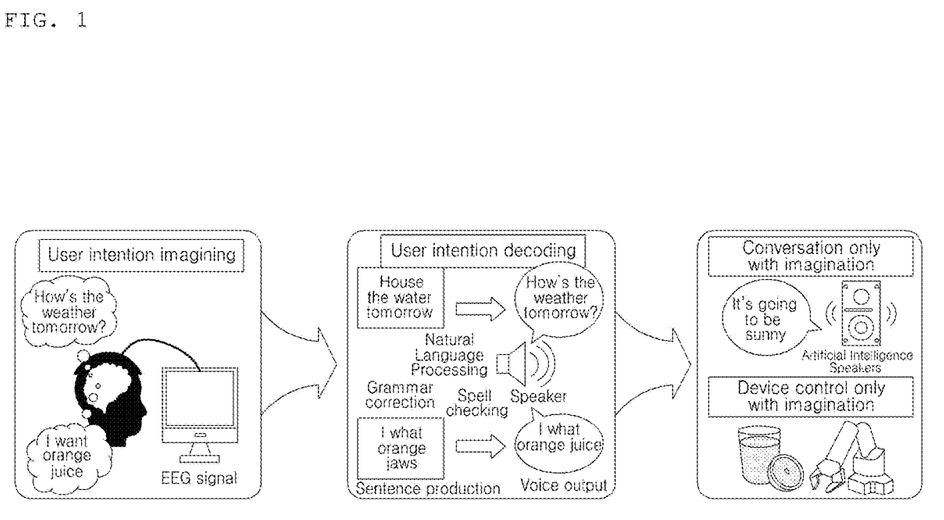
FIG. 1 is an exemplary view showing an imagined speech-based user intention delivery procedure using a brain-computer interface to which the present invention is applied.

FIG. 1 is an exemplary view showing an imagined speech-based user intention transmission procedure using a brain-computer interface to which the present invention is applied.

As described above, the brain-computer interface is a technology that detects significant signals from brain signals of a user, recognizes user intention, and provides an appropriate feedback for the recognized user intention. FIG. 1 shows a procedure in which only through a user's imagined speech, the user intention is delivered using such a brain-computer interface. Referring to FIG. 1, the user performs imagination of speech including a sentence or command to be delivered to the outside without using the tongue or muscles, that is, imagined speech. In specific, the user performs the imagined speech for a specific sentence or command onto which his or her intention is reflected, for example, "How's the weather tomorrow?" or "I want orange juice". The user's brain signals generated in the process of the imagined speech collected are to the form of electroencephalography (EEG) signals, and the collected brain signals are decoded to presume the sentence or command intended by the user upon his or her imagined speech. The presumed sentence or command is outputted directly to the outside through a speaker or converted into other signals and used to control an external device or apparatus. For example, if "How's the weather tomorrow?" or "I want orange juice" is presumed through the decoding, the presumed sentence or command is outputted as voice signals through the speaker to allow an AI speaker to provide information of tomorrow's weather in accordance with the corresponding voice signals or to allow a device such as a robot arm to provide orange juice for the user.

As shown in FIG. 1, if the brain signals generated during the imagined speech are successfully decoded using the brain-computer interface, it is possible for the user to deliver his or her intention freely to the outside, without having any natural speech. To efficiently deliver the user intention only through the imagined speech using the brain-computer interface, like this, it is necessary to have a method for accurately detecting a time point when the imagined speech including the user's specific intention is generated from the brain signals always generated to thus accurately presume the user intention from the brain signals measured.

Hereinafter, an explanation of a brain signal-based user assisting method and apparatus according to the present invention that is capable of accurately detecting a time point of the user's imagined speech and thus accurately presuming the user intention will be given in detail with reference to the attached drawings.

Figure 2:
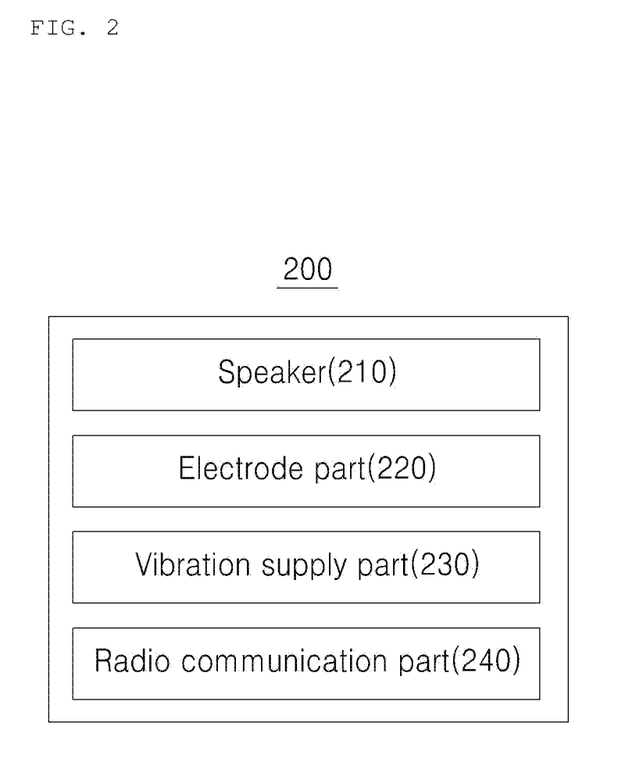
FIG. 2 is a block diagram showing a configuration of a brain signal-based user assisting apparatus according to the present invention.

FIG. 2 is a block diagram showing a configuration of a brain signal-based user assisting apparatus according to the present invention. In the description, hereinafter, it can be understood that an apparatus 200 represents the brain signal-based user assisting apparatus as will be explained with reference to FIG. 2, unless specifically defined. FIG. 2 just shows a desirable embodiment in which the objects of the present invention are accomplished. If necessary, accordingly, some parts may be added to the apparatus 200, some parts of the apparatus 200 may be omitted, and the functions performed by one part may be performed together with another part.

Referring to FIG. 2, the apparatus 200 according to the present invention includes a speaker 210 for outputting data generated therefrom in the form of voice signals, an electrode part 220 for acquiring brain signals from a user in a noninvasive method, a vibration supply part 230 for supplying vibrations, and a radio communication part 240 for performing radio communication with an external device or system.

Even if not shown in FIG. 2, the apparatus 200 includes at least one processor adapted to control or operate all of the parts thereof, a memory for loading a computer program executed by the processor, and a storage for storing the computer program. For example, the processor is any one of a central processing unit (CPU), a micro processor unit (MPU), a micro controller unit (MCU), and a processor widely known in the art. The memory stores all types of information and/or commands and loads one or more computer programs from the storage to execute a brain signal-based user assisting method according to the present invention. The storage stores one or more computer programs and large capacity network information in a non-temporary way. The storage is any one of non-volatile memory such as read-only memory (ROM), erasable programmable ROM (EPROM), electrically erasable programmable ROM (EEPROM), and flash memory, hard disc drive (HDD), solid state drive (SSD), detachable disc, and a computer readable recording medium widely known in the art. The computer program is loaded to the memory and executed by at least one processor, thereby performing the brain signal-based user assisting method according to the present invention.

Figure 3:
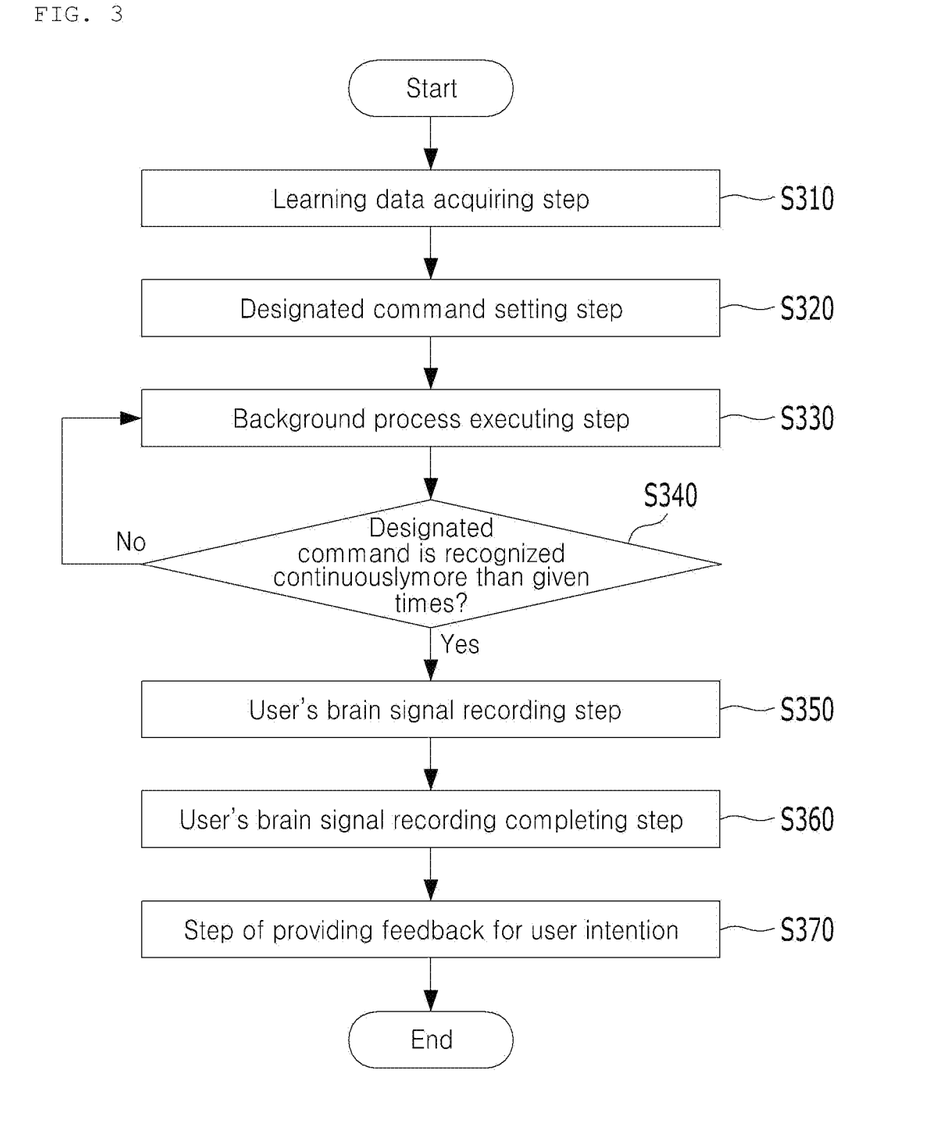
FIG. 3 is a flowchart showing a brain signal-based user assisting method according to the present invention.

FIG. 3 is a flowchart showing a brain signal-based user assisting method according to the present invention. In the description, hereinafter, it can be understood that the steps of the brain signal-based user assisting method according to the present invention are performed by the apparatus 200 as explained with reference to FIG. 2.

Referring to FIG. 3, learning data for learning classification models adapted to set a designated command is acquired by the apparatus 200 (at step S310). The learning data acquired at the step S310 includes brain signals generated when a user performs imagined speech for a specific command and/or brain signals generated when the user does not perform the imagined speech. To allow the apparatus 200 to acquire the learning data, in specific, the user determines M designated command candidates, and next, he or she performs the repeated imagined speech a given number of times in random order of the M designated command candidates. The apparatus 200 acquires the brain signals generated when the user performs the imagined speech for the M designated command candidates randomly and the brain signals generated when the user does not perform the imagined speech. In this case, the M designated command candidates are a collection of commands pre-set in the apparatus 200, a collection of commands arbitrarily determined by the user, or a combination thereof. Desirably, M is a number greater than or equal to 3.

An example of the learning data acquisition at the step S310 of FIG. 3 will be explained in detail below. If it is assumed that the designated command candidates determined by the user are "A", "B", and "C" (that is, M=3), the user performs the imagined speech repeatedly about 30 times in the random order of "A", "B", and "C". While the user is performing the imagined speech in the random order of "A", "B", and "C", the brain signals generated for two seconds are acquired by the apparatus 200. The brain signals acquired as the learning data by the apparatus 200 according to the present invention include at least some of the brain signals generated when the user performs the imagined speech for "A", the brain signals generated when the user performs the imagined speech for "B", the brain signals generated when the user performs the imagined speech for "C", and the brain signals generated when the user does not perform the imagined speech. In this case, the number of designated command candidates (M=3), the number of times (30 times) of the repeated imagined speech, and the given time (two seconds) for learning data acquisition are exemplary numerical values, which do not limit the scope of the present invention.

After the learning data has been acquired, one of the M designated command candidates is set as a designated command in accordance with the acquired learning data by the apparatus 200 (at step S320). A method for setting one designated command at the step S320 will be explained in detail with reference to FIG. 4.

Figure 4:
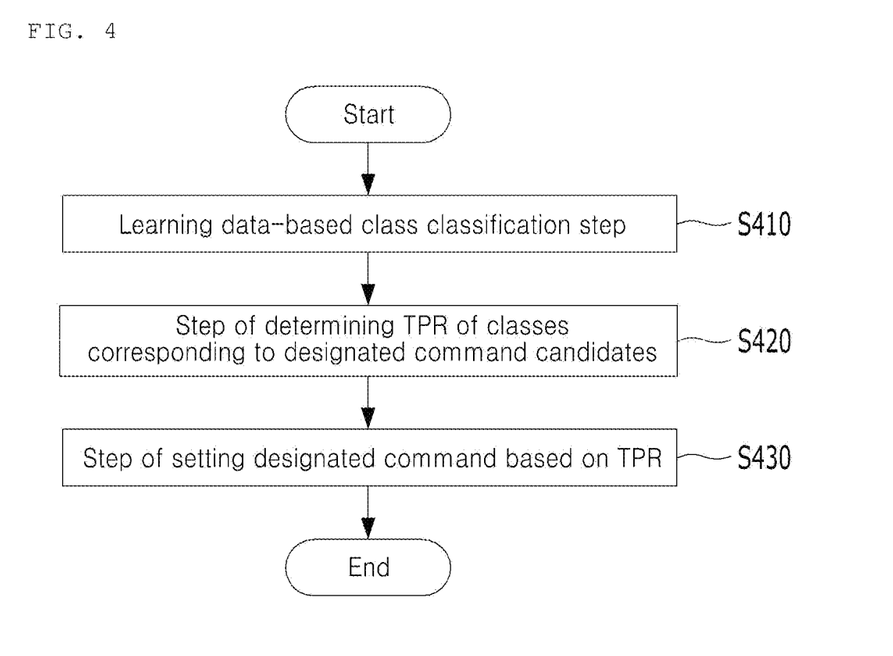
FIG. 4 is a flowchart showing a designated command setting method according to the present invention.

FIG. 4 is a flowchart showing a designated command setting method according to the present invention.

Referring to FIG. 4, the apparatus 200 extracts significant features from the learning data acquired at the step S310 through high frequency-based feature analysis and source analysis and performs class classification into M+1 classes using a classification method such as convolutional neural network (at step S410). In this case, the M is the number of designated command candidates as explained at the step S310. The M+1 classes include M classes corresponding to the brain signals generated when the user performs the imagined speech for the M designated command candidates and one class corresponding to the brain signals generated when the user does not perform the imagined speech. The apparatus 200 determines true positive rates (TPRs) of the classes corresponding to the M designated command candidates with respect to the M+1 classes determined at the step S410 (at step S420). The apparatus 200 sets as a designated command the designated command candidate corresponding to the class having the highest TPR among the determined TPRs of the classes corresponding to the M designated command candidates (at step S430). In this case, if it is checked that the TPRs of the classes corresponding to the M designated command candidates are less than or equal to a given reference value at the step S420, the apparatus 200 returns to the step S310 and acquires learning data again. Before the learning data is acquired again, the apparatus 200 recommends designated command candidates to the user. In this case, the designated command candidates recommended by the apparatus 200 may be pre-stored or set.

An example of the designated command setting at the step S320 of FIG. 3 and FIG. 4 will be explained in detail below. If it is assumed that the designated command candidates determined by the user are "A", "B", and "C" (that is, M=3), in the same manner as at the step S310, the apparatus 200 performs class classification for four classes through the feature analysis and classification method for the acquired learning data. In this case, the four classes include a first class corresponding to the brain signals generated when the user performs the imagined speech for "A", a second class corresponding to the brain signals generated when the user performs the imagined speech for "B", a third class corresponding to the brain signals generated when the user performs the imagined speech for "C", and a fourth class corresponding to the brain signals generated when the user does not perform the imagined speech. In this case, if the first class has the highest TPR, the apparatus 200 sets "A" corresponding to the first class as a designated command. Otherwise, if the second class has the highest TPR, the apparatus 200 sets "B" corresponding to the second class as a designated command. Otherwise, if the third class has the highest TPR, the apparatus 200 sets "C" corresponding to the third class as a designated command. If the TPRs of the first to third classes are less than or equal to a given reference value, the apparatus 200 recommends a new designated command "D" to the user and returns to the step S310 to perform the learning data acquisition.

Referring back to FIG. 3, if the designated command is set through the step S320, the apparatus 200 performs a background process for recognizing the designated command (at step S330). In the description, the background process represents a series of operations performed by the apparatus 200 to determine whether the user is in a resting state or performs the imagined speech for the set designated command to start or complete brain signal recording. The background process is a process of determining whether the user performs the imagined speech for the set designated command, and therefore, desirably, the background process is performed after the designated command has been set at the step S320. However, of course, it should be noted that the background process may be always performed irrespective of the order as shown. An explanation of the background process and a method for recognizing the designated command based on the background process will be given in detail with reference to FIG. 5.

Figure 5:
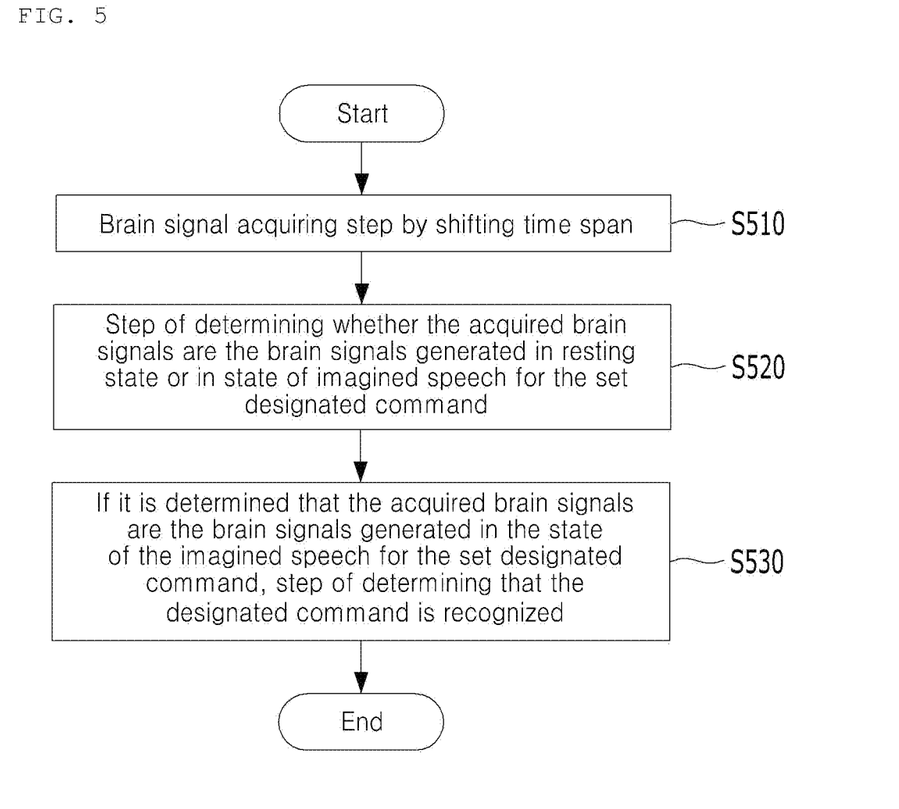
FIG. 5 is a flowchart showing a designated command recognizing method based on a background process according to the present invention; and (a) and (b) of FIG. 6 are exemplary views showing the brain signal-based user assisting apparatus according to the present invention is used.

FIG. 5 is a flowchart showing a designated command recognizing method based on the background process according to the present invention.

Referring to FIG. 5, the apparatus 200 shifts a time span having a given length on a time axis to acquire brain signals corresponding to respective time spans shifted (at step S510). According to the present invention, it is assumed that while the background process is performed, the apparatus 200 collects the brain signals generated from the user's brain in real time. That is, the apparatus 200 shifts a time span having a given time length $T_1$ by time $T_2$ on a time axis to acquire brain signals corresponding to the plurality of time spans shifted from the user's brain signals collected in real time. In specific, while the background process is performed, the apparatus 200 acquires the user's brain signals corresponding to the time spans of $[0, T_1]$, $[T_2, T_2+T_1]$, . . . $[m*T_2, m*T_2+T_1]$ . . . . For example, if the time span with two seconds shifts by 0.2 seconds, the apparatus 200 acquires the user's brain signals corresponding to the time spans of $[0, 2]$, $[0.2, 2.2]$, . . . $[m*0.2, m*0.2+2]$ . . . from the user's brain signals collected in real time.

After that, the apparatus 200 determines whether the user's brain signals corresponding to the time spans are generated in a resting state or in a state of the imagined speech for the set designated command (at step S520). The determination at the step S520 is performed through two classes based on a pre-learned classification method. In this case, the two classes based on the pre-learned classification method include a class corresponding to the resting state and a class corresponding to the state of the imagined speech for the set designated command.

If it is determined that the user's brain signals corresponding to the time spans are generated in the state of the imagined speech for the set designated command at the step S520, the apparatus 200 determines that the background process-based designated command is recognized (at step S530).

In the above, the method for recognizing the background process-based designated command by the apparatus 200 has been explained.

Referring back to FIG. 3, the apparatus 200 determines whether the designated command is recognized continuously more than given times (e.g., N times), while the background process is being performed (at step S340). Before the user performs the imagined speech in which his or her intention is contained, he or she performs the imagined speech for the set designated command more than N times, and next, he or she performs the imagined speech in which his or her intention is contained. Accordingly, the time point when the user intention occurs is detected through the background process-based designated command recognition at the step S340. In this case, N, the number of times of designated command recognition for starting the brain signal recording is a value for adjusting the sensitivity of the apparatus, which is pre-determined in the apparatus 200 or designated or determined directly by the user.

If it is determined that the designated command is recognized continuously more than N times at the step S340, the apparatus 200 assumes that the brain signals generated after the determination are the brain signals in which the user intention is contained and performs the brain signal recording (at step S350). The apparatus 200 converts the brain signals recorded at the step S350 into a text through a brain signal-based text recognition device-based on high frequency signal analysis and time series data processing algorithm. For example, the apparatus 200 performs phoneme unit classification every given time unit (e.g., 0.1 seconds), recognizes the user intention in the phoneme unit, and converts the recognized user intention into a text based on natural language processing and probability models.

Contrarily, if it is determined that the designated command is not recognized continuously more than N times at the step S340, the apparatus 200 assumes that the imagined speech in which the user intention is contained is not performed and thus monitors whether the designated command is recognized continuously more than N times, while performing the background process.

If the designated command is recognized continuously more than given times again during the brain signal recording, the apparatus 200 completes the brain signal recording (at step S360). After the user has performed the imagined speech in which his or her intention is contained, he or she performs the imagined speech for the designated command more than the given times in the same manner as when the brain signal recording is started, so that the apparatus 200 completes the brain signal recording. In this case, the number of times of designated command recognition for starting the brain signal recording may be equal to the number of times of designated command recognition for completing the brain signal recording, but they may be different from each other. In specific, they may be equal to or different from each other, which are pre-determined in the apparatus 200 or designated or determined directly by the user.

After the brain signal recording has been completed, the apparatus 200 provides the feedback for the user intention (at step S370). The feedback for the user intention is performed by transmitting the user intention converted into the text in the process of recording the user's brain signals to an external device or system such as the user's wearable device, smartphone, and smart home system. Accordingly, the user checks the user intention transmitted from the apparatus 200 through an output device of the external device or system to check whether his or her intention contained in his or her imagined speech is generated appropriately through the apparatus 200. Even while the 200 is providing the feedback, the apparatus 200 apparatus performs the background process and thus monitors the user's brain signals in real time.

The explanation of the brain signal-based user assisting method and apparatus according to the present invention has been given with reference to the attached drawings, and now, an example in which the brain signal-based user assisting apparatus according to the present invention is used will be described.

Figure 6:
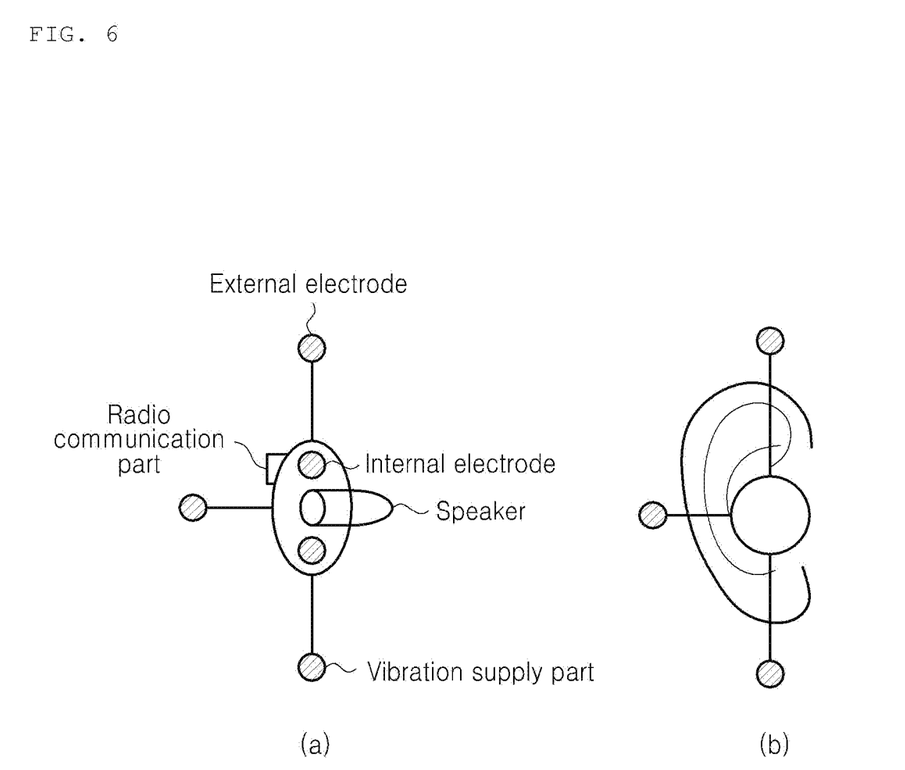

(a) and (b) of FIG. 6 are exemplary views showing the brain signal-based user assisting apparatus according to the present invention is used. The apparatus 200 for performing the brain signal-based user assisting method according to the present invention is simply worn on the user, like an earphone, to measure the brain signals in a non-invasive method, and the wearing example of the apparatus 200 is shown in (a) and (b) of FIG. 6. In specific, (a) of FIG. 6 shows the outer appearance of the apparatus 200 before worn on the user's ear, and (b) of FIG. 6 shows the state of the apparatus 200 worn on the user's ear. Referring to (a) and (b) of FIG. 6, the apparatus 200 includes the speaker 210 for outputting voice signals to the interior of the ear, the electrode part 220 having an internal electrode disposed inside the ear to measure the brain signals and an external electrode disposed outside the ear to measure the brain signals, the vibration supply part 230 for supplying vibrations, and the radio communication part 240 for performing radio communication, which have been explained with reference to FIG. 2. In this case, the internal electrode is a dry electrode that serves as a ground, and the external electrode is a semi-dry electrode that is connected through an electric wire and attached to the skin. If the apparatus 200 is worn on the ear, like an earphone, as shown in (a) and (b) of FIG. 6, lotion containing a conductive material may be applied around the ear to enhance the effectiveness of the brain signal measurement.

Even though not shown explicitly, the apparatus 200 as shown in (a) and (b) of FIG. 6 further includes the processor adapted to control or operate all of parts thereof, the memory for loading the computer program executed by the processor, and the storage for storing the computer program, which have been explained with reference to FIG. 2.

As described above, the brain signal-based user assisting apparatus and method according to the present invention is simply worn on the user's ear, like the earphone, to collect the brain signals generated when the user performs the imagined speech, recognize the user intention only from the imagination, and transmit the recognized user intention to the external device or system such as wearable device, smartphone, and smart device, thereby providing the conveniences of use for the user.

Further, the brain signal-based user assisting apparatus and method according to the present invention designates the specific commands by user that are most effectively recognized from complex and unclear non-invasive brain waves of the human and thus accurately detects a time point when the user intention is generated.

The effectiveness of the invention is not limited as mentioned above, and it should be understood to those skilled in the art that the effectiveness of the invention may include another effectiveness as not mentioned above from the detailed description of the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A brain signal-based user assisting method comprising the steps of:
    acquiring learning data for setting a designated command;
    setting one of a plurality of designated command candidates as a designated command, based on the acquired learning data;
    performing a background process for recognizing the designated command;
    determining whether the designated command is recognized continuously more than given times, based on the background process; and
    if it is determined that the designated command is recognized continuously more than the given times, performing a user's brain signal recording,
    wherein the step of performing the background process comprises the steps of:
    acquiring brain signals corresponding to a first time span;
    determining whether the brain signals corresponding to the first time span are brain signals generated in a resting state or in a state of imagined speech for the set designated command; and
    if it is determined that the brain signals corresponding to the first time span are the brain signals generated in the state of imagined speech for the set designated command, determining that the designated command is recognized in the first time span.

2. The brain signal-based user assisting method according to claim 1, wherein the learning data has at least some of the brain signals generated when the user performs imagined speech for the plurality of designated command candidates randomly.

3. The brain signal-based user assisting method according to claim 1, wherein the step of setting the designated command comprises the steps of:
    classifying the learning data collected for M designated command candidates into M+1 classes;
    determining true positive rates (TPRs) of the classes corresponding to the M designated command candidates; and
    determining as the designated command the designated command candidate corresponding to the class having the highest TPR.

4. The brain signal-based user assisting method according to claim 3, further comprising the step of acquiring the learning data for setting the designated command again if the TPRs of the classes corresponding to the M designated command candidates are less than or equal to a given reference value.

5. The brain signal-based user assisting method according to claim 4, wherein the step of acquiring the learning data for setting the designated command again comprises the step of recommending at least one designated command candidate to the user, and the learning data acquired again is based on the at least one designated command candidate recommended.

6. The brain signal-based user assisting method according to claim 1, wherein the step of performing the background process further comprises the steps of:

acquiring brain signals corresponding to a second time span obtained by shifting the first time span by given time;

determining whether the brain signals corresponding to the second time span are the brain signals generated in the resting state or in the state of the imagined speech for the set designated command; and if it is determined that the brain signals corresponding to the second time span are the brain signals generated in the state of the imagined speech for the set designated command, determining that the designated command is recognized in the second time span.

7. The brain signal-based user assisting method according to claim 1, wherein the step of performing the user's brain signal recording comprises the step of converting the user's recorded brain signals into a text.

8. The brain signal-based user assisting method according to claim 7, further comprising the step of transmitting the converted text to a device for user feedback.

9. The brain signal-based user assisting method according to claim 1, further comprising the step of completing the user's brain signal recording if the designated command is recognized continuously more than the given times after the step of performing the user's brain signal recording.

10. A brain signal-based user assisting apparatus comprising:
   at least one processor;
   a memory for loading a computer program executed by the at least one processor; and
   a storage for storing the computer program,
   wherein through the at least one processor, the computer program acquires learning data for setting one of a plurality of designated command candidates as a designated command, based on the acquired learning data, performs a background process for recognizing the designated command, determines whether the designated command is recognized continuously more than given times, based on the background process, and if it is determined that the designated command is recognized continuously more than the given times, performs a user's brain signal recording,
   wherein the background process comprises the steps of:
   acquiring brain signals corresponding to a first time span;
   determining whether the brain signals corresponding to the first time span are brain signals generated in a resting state or in a state of imagined speech for the set designated command; and
   if it is determined that the brain signals corresponding to the first time span are the brain signals generated in the state of imagined speech for the set designated command, determining that the designated command is recognized in the first time span.

11. A computer program stored in a non-transitory computer readable recording medium, the computer program being coupled to a computing device to acquire learning data for setting a designated command, set one of a plurality of designated command candidates according to the acquired learning data as a designated command, perform a background process for recognizing the designated command, determine whether the designated command is recognized continuously more than given times according to the background process, and if it is determined that the designated command is recognized continuously more than the given times, perform a user's brain signal recording,
   wherein the background process comprises the steps of:
   acquiring brain signals corresponding to a first time span;
   determining whether the brain signals corresponding to the first time span are brain signals generated in a resting state or in a state of imagined speech for the set designated command; and
   if it is determined that the brain signals corresponding to the first time span are the brain signals generated in the state of imagined speech for the set designated command, determining that the designated command is recognized in the first time span.

* * * * *